US012356165B2

(12) United States Patent
Guglielmone, Jr. et al.

(10) Patent No.: US 12,356,165 B2
(45) Date of Patent: Jul. 8, 2025

(54) METHOD AND SYSTEM FOR CONTEXT-DEPENDENT AUTOMATIC VOLUME COMPENSATION

(71) Applicant: Apple Inc., Cupertino, CA (US)

(72) Inventors: Ronald J. Guglielmone, Jr., Redwood City, CA (US); Christopher T. Eubank, Santa Barbara, CA (US)

(73) Assignee: Apple Inc., Cupertino, CA (US)

( * ) Notice: Subject to any disclaimer, the term of this patent is extended or adjusted under 35 U.S.C. 154(b) by 520 days.

(21) Appl. No.: 17/818,652

(22) Filed: Aug. 9, 2022

(65) Prior Publication Data

US 2023/0099275 A1 Mar. 30, 2023

Related U.S. Application Data

(60) Provisional application No. 63/248,342, filed on Sep. 24, 2021.

(51) Int. Cl.
*H04R 5/04* (2006.01)

(52) U.S. Cl.
CPC ........... *H04R 5/04* (2013.01); *H04R 2430/01* (2013.01)

(58) Field of Classification Search
CPC .... H04R 5/04; H04R 2430/01; H04R 1/1041; H04R 5/033; H04R 2460/07; H03G 3/32; H03G 5/00; H03G 5/025; H03G 5/02; H03G 7/00; H03G 3/20; H03G 2430/01
USPC ........................................... 381/104–109, 57
See application file for complete search history.

(56) References Cited

U.S. PATENT DOCUMENTS

| | | | | |
|---|---|---|---|---|
| 8,588,430 B2 * | 11/2013 | Tirry | H04M 9/082 381/103 |
| 8,817,993 B2 * | 8/2014 | Hsu | H03G 3/32 381/86 |
| 9,571,628 B1 | 2/2017 | Bostick et al. | |
| 10,103,702 B2 | 10/2018 | Putta et al. | |
| 10,121,491 B2 * | 11/2018 | Ozcan | H03G 7/007 |
| 10,355,658 B1 | 7/2019 | Yang | |
| 11,239,810 B2 * | 2/2022 | Mahadeva | H04R 1/08 |
| 2004/0218768 A1 * | 11/2004 | Zhurin | H03G 3/32 381/104 |

(Continued)

FOREIGN PATENT DOCUMENTS

CN 112104950 A 12/2020

OTHER PUBLICATIONS

Sony, "LinkBuds Truly Wireless Earbuds", received from https://electronics.sony.com/audio/headphones/truly-wireless-earbuds/p/wfl900-h, Model: LinkBuds, WFL900/H, 2023, 8 pages.

(Continued)

*Primary Examiner* — Xu Mei
(74) *Attorney, Agent, or Firm* — Aikin & Gallant, LLP

(57) ABSTRACT

A method performed by a programmed processor of an electronic device. The device obtains an audio signal, obtains, using one or more microphones, a microphone signal that includes audio of an environment in which the electronic device is located. The device determines a context of the device, and selects a volume compensation model from several models based on the determined context. The device processes the audio signal according to the selected volume compensation model and the microphone signal, and uses the processed audio signal to drive one or more speakers of the device.

20 Claims, 5 Drawing Sheets

(56) References Cited

U.S. PATENT DOCUMENTS

| | | | | |
|---|---|---|---|---|
| 2008/0144860 | A1* | 6/2008 | Haller | H03G 3/10 381/104 |
| 2009/0022329 | A1* | 1/2009 | Mahowald | H03G 3/32 381/57 |
| 2011/0058056 | A1 | 3/2011 | Lindahl et al. | |
| 2011/0093620 | A1 | 4/2011 | Batson et al. | |
| 2011/0200210 | A1* | 8/2011 | Kemmochi | H04M 19/04 381/107 |
| 2012/0177210 | A1 | 7/2012 | Goldstein et al. | |
| 2013/0279706 | A1* | 10/2013 | Marti | G06F 1/1688 381/57 |
| 2013/0287215 | A1* | 10/2013 | Kim | H03G 5/165 381/57 |
| 2013/0329908 | A1 | 12/2013 | Lindahl et al. | |
| 2014/0037109 | A1* | 2/2014 | Ban | H03G 3/20 381/107 |
| 2014/0247948 | A1 | 9/2014 | Goldstein | |
| 2014/0314261 | A1* | 10/2014 | Selig | H04R 25/70 381/314 |
| 2016/0249145 | A1 | 8/2016 | Ohl et al. | |
| 2017/0126192 | A1* | 5/2017 | Fu | H04R 3/00 |
| 2020/0186912 | A1* | 6/2020 | Essid | H04R 1/1091 |
| 2020/0394015 | A1 | 12/2020 | Usher et al. | |
| 2022/0199066 | A1 | 6/2022 | Trivedi et al. | |
| 2023/0099275 | A1 | 3/2023 | Guglielmone, Jr. et al. | |
| 2023/0113703 | A1* | 4/2023 | Eubank | H04R 27/00 381/303 |
| 2023/0308067 | A1* | 9/2023 | Mehta | H03G 3/32 |
| 2023/0412964 | A1* | 12/2023 | Watanabe | A63F 13/54 |
| 2024/0361975 | A1* | 10/2024 | Rau | H04R 1/10 |
| 2024/0365064 | A1* | 10/2024 | Greenwood | H04R 5/04 |

OTHER PUBLICATIONS

Supraja Meedinti, Neil Dhillon, "Automatic adjustment of device vol. based on context", Technical Disclosure Commons, Defensive Publication Series, May 6, 2019, 7 pages.

* cited by examiner

Volume Compensation Model Data Structure 35

| Audio Tuning Parameters / Model(s) | Scalar Gain Value | Compressor Type | Compression Ratio | Attack Time | Release Time | ∘∘∘ |
|---|---|---|---|---|---|---|
| Volume Compensation Model #1 | $V_1$ | Broadband | $R_1$ | $T_{A1}$ | $T_{R1}$ | |
| Volume Compensation Model #2 | $V_2$ | Multi-Band | $R_2$ | $T_{A2}$ | $T_{R2}$ | |
| ∘∘∘ | | | | | | |

Fig. 3

METHOD AND SYSTEM FOR CONTEXT-DEPENDENT AUTOMATIC VOLUME COMPENSATION

This application claims the benefit of U.S. Provisional Patent Application No. 63/248,342 filed Sep. 24, 2021, which is incorporated herein by reference.

FIELD

An aspect of the disclosure relates to a method and a system for context-dependent automatic volume compensation. Other aspects are also described.

BACKGROUND

Headphones are audio devices that include a pair of speakers, each of which is placed on top of a user's car when the headphones are worn on or around the user's head. Similar to headphones, earphones (or in-ear headphones) are two separate audio devices, each having a speaker that is inserted into the user's ear. Headphones and earphones are normally wired to a separate playback device, such as a digital audio player, that drives each of the speakers of the devices with an audio signal in order to produce sound (e.g., music). Headphones and earphones provide a convenient method by which a user can individually listen to audio content, while not having to broadcast the audio content to others who are nearby.

SUMMARY

An aspect of the disclosure is a method performed by (e.g., a programmed processor integrated within) an electronic device, such as a wearable device (e.g., a pair of smart glasses, a smart watch, a pair of wireless headphones, etc.) for performing context-dependent automatic volume compensation. The electronic device obtains an audio signal, which may contain user-desired audio content, such as a musical composition, a podcast, a movie soundtrack, etc., and obtains, using one or more microphones, a microphone signal that includes audio (or ambient noise) of an environment in which the electronic device is located. The electronic device determines a context of the electronic device, and selects a volume compensation model from several volume compensation models based on the determined context. The electronic device processes the audio signal according to the selected volume compensation model and the microphone signal, and uses the processed audio signal to drive one or more speakers of the electronic device.

In one aspect, the context of the electronic device may be determined based on the audio content of the audio signal. For example, when the audio content does not include speech, the selected volume compensation model may include a broadband compressor for compressing an entire frequency range of the audio signal, whereas when the audio content does include speech, the selected volume compensation model may include a multi-band compressor for compressing a subset of one or more frequency bands of the entire frequency range of the audio signal. In some aspects, the context of the electronic device includes an indication that one or more software applications are being executed by the programmed processor of the electronic device, where the audio signal may be associated with a software application with which a user of the electronic device is interacting. In another aspect, the context of the electronic device is based on sensor data from one or more sensors of the electronic device, such as a global positioning system (GPS) sensor, a camera, a microphone, a thermistor, an inertial measurement unit (IMU), and an accelerometer. In some aspects, the context of the electronic device includes activity of the user, such as at least one of an interaction between the user and the electronic device (e.g., the device receiving user input via one or more input devices) and a physical activity performed by the user while the electronic device is a part of or coupled to the user (e.g., while being worn or held by the user). In some aspects, the context of the electronic device is a location of the device.

In one aspect, the electronic device determines a change to the context of the electronic device, selects a different volume compensation model from the several volume compensation models based on the change to the context, and processes the audio signal according to the selected different volume compensation model and the microphone signal. In one aspect, each volume compensation model comprises at least one of one or more scalar gain values to apply to the audio signal, a broadband compressor or a multi-band compressor, a compression ratio, an attack time of the broadband compressor or the multi-band compressor for applying the compression ratio, and a release time of the broadband compressor or the multi-band compressor for removing the compression ratio.

In one aspect, processing the audio signal according to the selected volume compensation model and the microphone signal includes using the selected volume compensation model to compensate the audio signal for the audio of the environment. In some aspects, the electronic device is a portable device. In another aspect, the electronic device is a wearable device, such as a pair of smart glasses or a smart watch. In another aspect, one or more speakers are integrated within the electronic device, where the electronic device does not include a hardware volume control that is arranged to adjust a sound output level of the one or more speakers of the electronic device.

According to another aspect of the disclosure, a method performed by an audio playback software application that is being executed by a programmed processor of an electronic device that does not include a volume control to perform context-dependent automatic volume compensation. The electronic device receives an audio signal that includes audio content, and receives sensor data from one or more sensors that are arranged to sense conditions of an environment in which the electronic device is located. The electronic device determines a device snapshot that includes a current state of each of one or more software applications that are being executed by the electronic device, where the one or more software applications includes the audio playback software application. The electronic device determines at least one audio tuning parameter for a volume compensator based on the sensor data, the snapshot of the one or more software applications, and the audio content of the audio signal. The device processes, using the volume compensator the audio signal according to the determined audio tuning parameter, and uses the processed audio signal to driver one or more speakers.

In one aspect, the current state of each of the one or more software indicates at least one of the software application that is currently being executed by the electronic device, a user of the electronic device is interacting with a software application, and whether the audio content of the audio signal is associated with the software application. In another aspect, the device snapshot is a first device snapshot that includes a first state of a software application that is being executed by the electronic device, and the method further includes determining a second device snapshot that includes a second state of the software application that different than the first state; determining a different audio tuning parameter based on at least the second state of the software application; and processing the audio signal according to the determined different audio tuning parameter. In some aspects, determining the at least one audio tuning parameter includes determining a scalar gain value for the volume compensator to apply to the audio signal, and a compression ratio, an attack time, and a release time for which the volume compensator is to compress the audio signal.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

FIG. 3 shows an example of a data structure that includes volume compensation models according to some aspects.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Figure 1:
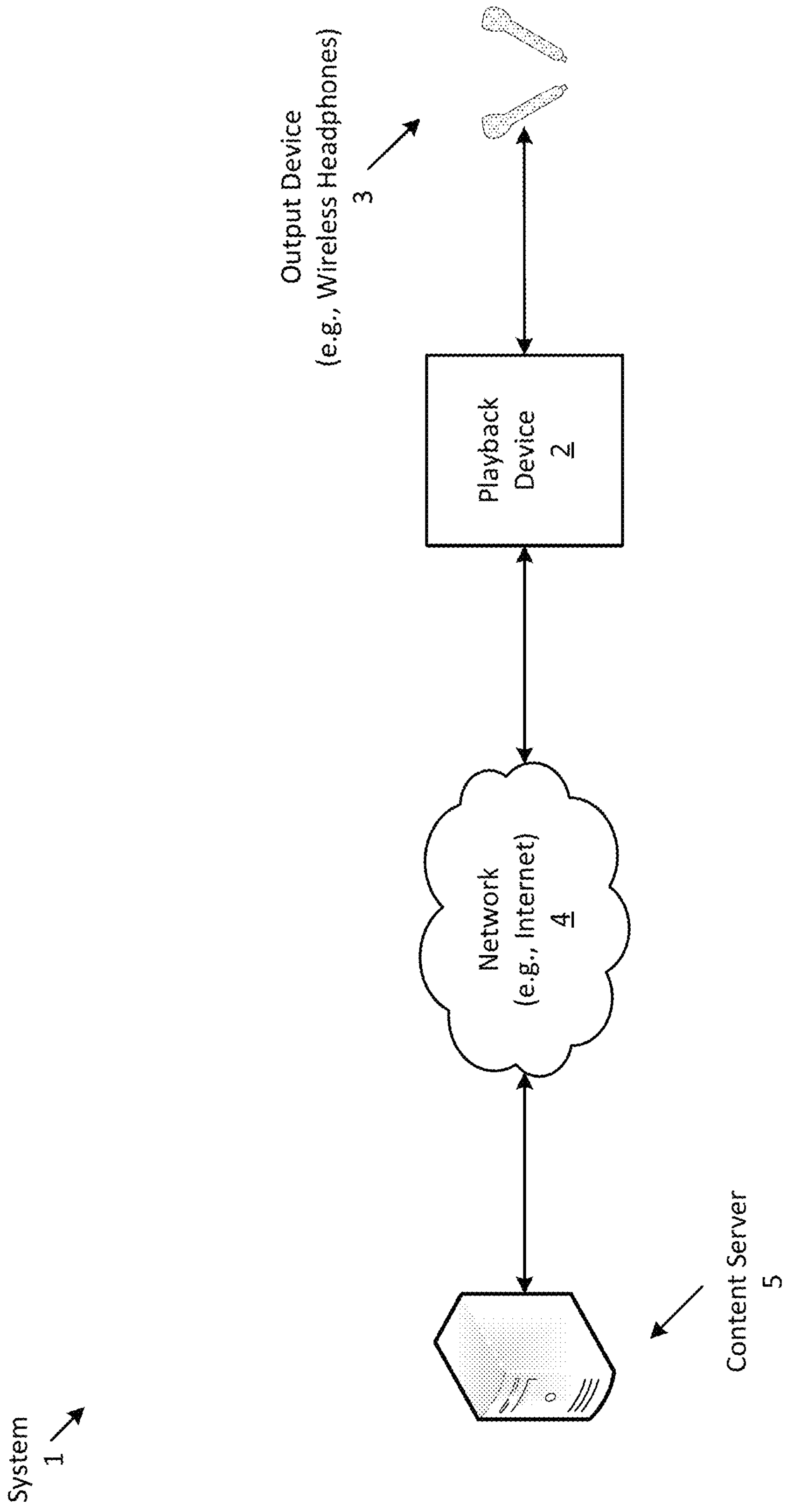
FIG. 1 shows a block diagram of a system according to one aspect.

FIG. 1 shows a block diagram of a system (or audio system) 1 according to one aspect. Specifically, the system 1 includes a playback device 2, an output device 3, a (e.g., computer) network (e.g., the Internet) 4, and a content server 5. In one aspect, the system may include more or fewer elements, such as having additional content servers, or not including content servers and/or a playback device. In which case, the output device may perform all (or most) of the audio signal processing operations, as described herein.

In one aspect, the content server 5 may be a stand-alone electronics server, a computer (e.g., desktop computer), or a cluster of server computers that are configured to store, stream, and/or receive digital content, such as audio content (e.g., as one or more audio signals in any audio format). In another aspect, the content server may store video and/or audio content, such as movies, for streaming (transmitting) to one or more electronic devices. As shown, the server is communicatively coupled (e.g., via the network 4) to the playback device 2 in order to stream (e.g., audio) content for playback (e.g., via the output device). In another aspect, the content server may be communicatively coupled (e.g., directly) to the output device.

In one aspect, the playback device may be any electronic device (e.g., with electronic components, such as one or more processors, memory, etc.) that is capable of streaming audio content, in any format, such as stereo audio signals, for playback (e.g., via one or more speakers integrated within the playback device and/or via one or more output devices, as described herein). For example, the playback device may be a desktop computer, a laptop computer, a digital media player, etc. In one aspect, the device may be a portable electronic device (e.g., being handheld operable), such as a tablet computer, a smart phone, etc. In another aspect, the playback device may be a wearable device (e.g., a device that is designed to be worn on (e.g., attached to clothing and/or a body of) a user, such as a smart watch.

In one aspect, the output device 3 may be any (e.g., portable) electronic device that includes at least one speaker and is configured to output (or playback) sound by driving the speaker(s) with audio signal(s). For instance, as illustrated the device is a wireless headset (e.g., in-ear headphones or earphones) that are designed to be positioned on (or in) a user's ears and are designed to output sound into the user's ear canal. In some aspects, the earphone may be a sealing type that has a flexible ear tip that serves to acoustically seal off the entrance of the user's ear canal from an ambient environment by blocking or occluding in the ear canal. As shown, the output device includes a left earphone for the user's left ear and a right earphone for the user's right ear. In this case, each earphone may be configured to output at least one audio channel of audio content (e.g., the right earphone outputting a right audio channel and the left earphone outputting a left audio channel of a two-channel input of a stereophonic recording, such as a musical work). In another aspect, the output device may be any electronic device that includes at least one speaker and is arranged to be worn by the user and arranged to output sound by driving the speaker with an audio signal. As another example, the output device may be any type of headset, such as an over-the-ear (or on-the-car) headset that at least partially covers the user's ears and is arranged to direct sound into the ears of the user. In another aspect, the output device may be a wearable electronic device, such as smart glasses or a smart watch.

In some aspects, the output device may be a head-worn device, as illustrated herein. In another aspect, the output device may be any electronic device that is arranged to output sound into an ambient environment. Examples may include a stand-alone speaker, a smart speaker, a home theater system, or an infotainment system that is integrated within a vehicle. In another aspect, the output device as a head-worn device may be arranged to output sound into the ambient environment. For instance, when the output device is a pair of smart glasses, the output device may include "extra-aural" speakers that are arranged to project sound into the ambient environment (e.g., in a direction that is away from at least a portion, such as ears or ear canals, of a wearer), which are in contrast to "internal" speakers of a pair of headphones that are arranged to project sound into (or towards) a user's ear canal when worn.

As described herein, the output device may be a wireless device that may be communicatively coupled to the playback device in order to exchange (e.g., audio) data. For instance, the playback device may be configured to establish the wireless connection with the output device via a wireless communication protocol (e.g., BLUETOOTH protocol or any other wireless communication protocol). During the established wireless connection, the playback device may exchange (e.g., transmit and receive) data packets (e.g., Internet Protocol (IP) packets) with the output device, which may include audio digital data in any audio format.

In one aspect, the output device may include electronic components in order to perform audio signal processing operations, such as one or more processors, memory, etc. In another aspect, the output device may not include one or more user controls for adjusting audio playback. For example, the output device may not include a (e.g., physical) volume control, such as an adjustable knob or (e.g., physical) button. In some aspects, the output device may not include any physical controls for configuring (or instructing) the device to perform one or more operations, such as adjusting the volume. In another aspect, the output device may include one or more controls (e.g., a power button), but may still not include a (e.g., dedicated) control for adjusting a volume level of sound output at the output device. As a result, the output device may be configured to perform context-dependent automatic volume compensation (AVC) in order to automatically adjust the volume level based on one or more criteria. For example, the output device may adapt the volume level to compensate for noise when a user moves from a quiet environment (e.g., a house) into a noisy environment (e.g., a busy intersection), without requiring the user to manually adjust a volume control (e.g., by turning up the volume). More about context-dependent AVC is described herein.

In another aspect, either (or both) of the playback device 2 and the output device 3 may be designed to receive user input. For example, when the playback device is a smart phone, the device may include a touch-sensitive display screen (not shown) that is arranged to receive user input as a user of the device touches the display screen (e.g., by tapping the screen with one or more fingers). In another aspect, the devices may be designed to sense voice commands of a user, as user input. For instance, the playback (and/or output) device may include one or more microphones that are arranged to sense speech (and ambient sound). The device may be configured to detect the presence of speech within one or more microphone signals. Once detected, the device may analyze the speech in order to determine whether the speech contains a voice command to perform one or more operations. More about the output (and/or playback) device receiving user input is described herein.

In another aspect, the playback device 2 may communicatively couple with the output device 3 via other methods. For example, both devices may couple via a wired connection. In this case, one end of the wired connection may be (e.g., fixedly) connected to the output device, while another end may have a connector, such as a media jack or a universal serial bus (USB) connector, which plugs into a socket of the playback device. Once connected, the playback device may be configured to drive one or more speakers of the output device with one or more audio signals, via the wired connection. For instance, the playback device may transmit the audio signals as digital audio (e.g., PCM digital audio). In another aspect, the audio may be transmitted in analog format.

In some aspects, the playback device 2 and the output device 3 may be distinct (separate) electronic devices, as shown herein. In another aspect, the playback device may be a part of (or integrated with) the output device. For example, at least some of the components of the playback device (such as one or more processors, memory, etc.) may be part of the output device, and/or at least some of the components of the output device may be part of the playback device. In which case, at least some of the operations performed by the playback device (e.g., streaming audio content from the audio content server 5) may be performed by the output device.

Figure 2:
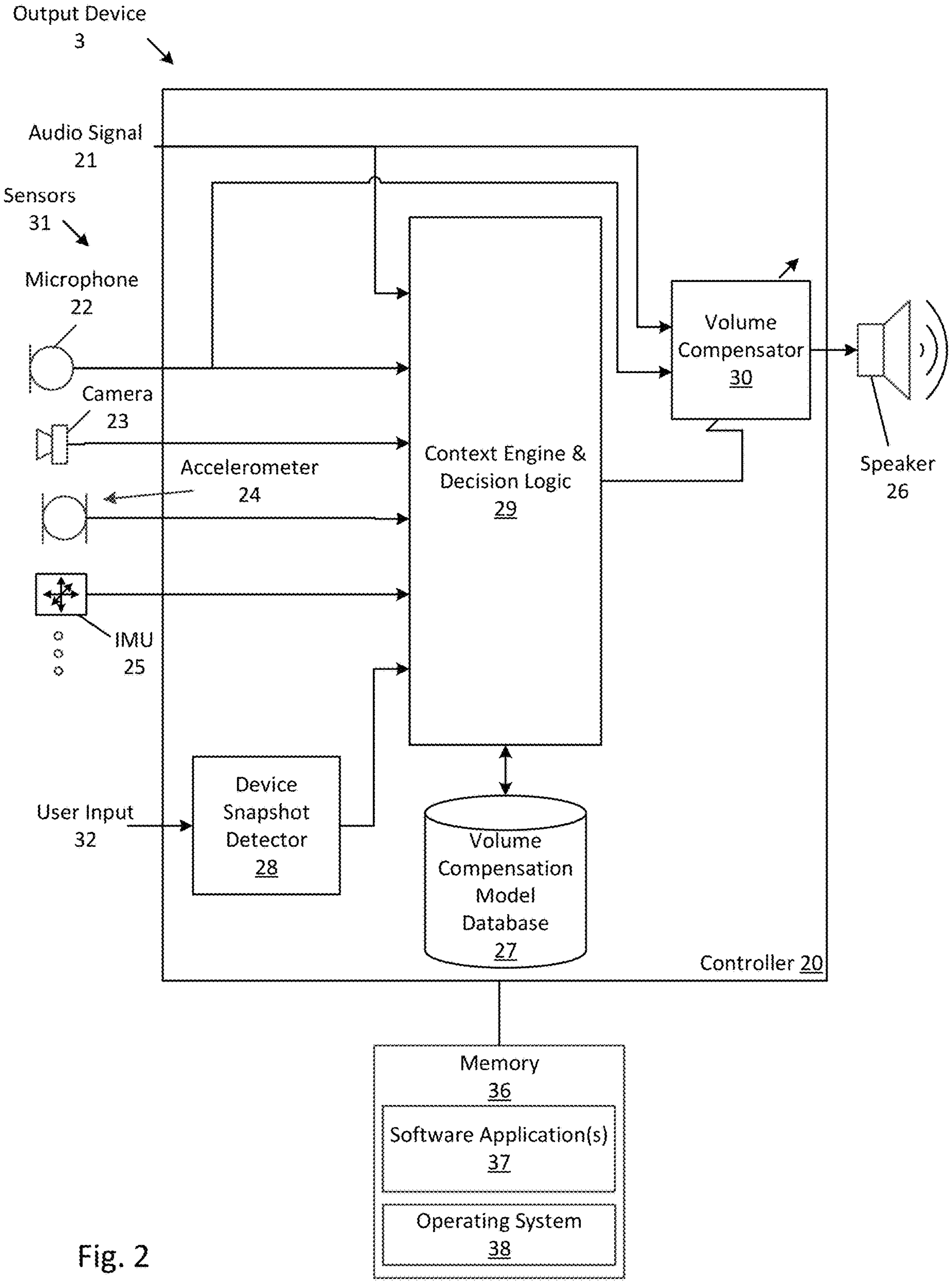
FIG. 2 shows a block diagram of an output device that performs context-dependent automatic volume compensation according to one aspect.

FIG. 2 shows a block diagram of the output device 3 that performs context-dependent automatic AVC according to one aspect. Specifically, the output device may perform the context-dependent AVC in order to adapt sound output (e.g., while using an audio signal 21 to drive speaker 26) of the output device based on a context of the output device. The output device is configured to automatically compensate a volume level of sound output (and/or perform one or more audio signal processing operations) based on a contextual analysis of the output device (and/or the user of the output device). As described herein, such an analysis may involve analyzing 1) the environment in which the output device is located, 2) a device snapshot of the output device (e.g., which may indicate what software applications are being executed, activity of the user of the output device, etc.), and/or 3) the audio content that is being played back by the output device. From (at least some of) this analysis, the output device may determine a context of the output device. For example, the output device may determine that the device (and the user of the device) are in a quiet environment (e.g., based on an analysis of one or more microphone signals captured by microphone 22), which as a result the output device may reduce the overall volume level. The volume level may be reduced since less sound output may be required to mask ambient noise within the quiet environment. Thus, the contextual analysis allows the output device to optimize a listener's experience by adapting the volume level and/or perform one or more audio signal processing operations (e.g., dynamic range compression) upon one or more audio signals for playback by the output device. More about the output device performing context-dependent AVC is described herein.

In one aspect, the output device includes one or more sensors 31 that include a microphone 22, a camera 23, an accelerometer 24, and an inertial measurement unit (IMU) 25, a speaker 26, a controller 20, and memory 36. In one aspect, the output device may include more or fewer elements, such as having multiple (e.g., two or more) microphones and/or speakers, or not including one or more of the sensors, such as the IMU and/or accelerometer.

The memory 36 may be any type of (e.g., non-transitory machine-readable) storage medium, such as random-access memory, CD-ROMS, DVDs, Magnetic tape, optical data storage devices, flash memory devices, and phase change memory. In one aspect, the memory may be a part of (e.g., integrated within) the output device. For instance, the memory may be a part of the controller 20. In some aspects, the memory may be a separate device, such as a data storage device. In which case, the memory may be communicatively coupled (e.g., via a network interface) with the controller 20 in order for the controller to perform one or more of the operations described herein.

As shown, the memory has stored therein, an operating system (OS) 38 and one or more software applications 37, which when executed by the controller cause the output device to perform one or more operations, as described herein. In one aspect, the memory may include more or less applications. The OS 38 is a software component that is responsible for management and coordination of activities and the sharing of resources (e.g., controller resources, memory, etc.) of the output device. In one aspect, the OS acts as a host for application programs (e.g., application(s) 37) that run on the device. In some aspects, the applications may run on top of the OS. In one aspect, the OS provides an interface to a hardware layer (not shown) of the output device, and may include one or more software drivers that communicate with the hardware layer. For example, the drivers can receive and process data packets received through the hardware layer from one or more other devices that are communicatively coupled to the device (e.g., the one or more of the sensors 31, etc.).

As described herein, the memory includes one or more software applications 37, which include instructions that when executed by the controller 20 (e.g., one or more processors), causes the output device to perform one or more operations. For example, the output device may include a navigation application that retrieves routing (navigation) instructions (e.g., from a remote server via the network 4), and presents the routing instructions to a user of the output device (e.g., audible instructions via the speaker 26). Other types of software applications may include an alarm application, the navigation application, a map application (which is for presenting maps and/or location information to the user), a media (e.g., audio and/or video) playback application, a social media application (e.g., an application that provides a user interface of an online social media platform), an exercise application (e.g., an application that keeps track of a user's physical activity), a health care application (e.g., an application that sets and keeps track of health-orientated goals of a user), a telephony application (which allows a user to place a phone call via a cellular network, such as a 4G Long Term Evolution (LTE) network, of the network 4, etc.

The controller 20 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform audio signal processing operations and/or networking operations. For instance, the controller 20 may perform context-dependent AVC operations in order to adjust a volume (or sound) level of sound output of one or more speakers 26 of the output device. More about the operations performed by the controller 20 is described herein.

In one aspect, the one or more sensors 31 are configured to detect the environment (e.g., in which the output device is located) and produce sensor data based on the environment. The microphone 22 may be any type of microphone (e.g., a differential pressure gradient micro-electro-mechanical system (MEMS) microphone) that is configured to convert acoustical energy caused by sound wave propagating in an acoustic environment into a microphone signal. In one aspect, the camera 23 is configured to capture image data (e.g., still digital images and/or video that is represented by a series of digital images). In some aspects, the camera is a complementary metal-oxide-semiconductor (CMOS) image sensor that is capable of capturing digital images including image data that represent a field of view of the camera, where the field of view includes a scene of an environment in which the output device is located. In some aspects, the camera may be a charged-coupled device (CCD) camera type. In one aspect, the camera may be positioned anywhere about the output device in order to capture one or more fields of view. In some aspects, the device may include multiple cameras (e.g., where each camera may have a different field of view).

The accelerometer 24 is arranged and configured to receive (detect or sense) speech vibrations that am produced while a user (e.g., who may be wearing the output device) is speaking, and produce an accelerometer signal that represents (or contains) the speech vibrations. Specifically, the accelerometer is configured to sense bone conduction vibrations that are transmitted from the vocal cords of the user to the user's ear (ear canal), while speaking and/or humming. For example, when the output device is a wireless headset, the accelerometer may be positioned anywhere on or within the headphone, which may touch a portion of the user's body in order to sense vibrations caused while the user speaks. The IMU is designed to measure the position and/or orientation of the output device. For instance, the IMU may produce sensor (or motion) data that indicates a change in orientation (e.g., about any X, Y, Z-axes) of the output device and/or a change in the position of the device. Thus, the IMU may produce motion data that may indicate a direction and speed at which the output device is moving from one location (e.g., to another location).

In one aspect, the output device may include additional sensors 31. For instance, the output device may include a thermistor (or temperature sensor) that is configured to detect a (e.g., ambient) temperature as sensor data. In another aspect, the thermistor may be arranged to measure an internal temperature (e.g., a temperature of an electronic component, such as a processor) of the output device. As another example, the sensors may include a Global Positioning System (GPS) sensor that may produce location data that indicates a location of the output device. In one aspect, from the location data, the controller 20 may determine motion data that indicates direction and/or speed of movement of the output device.

The speaker 26 may be an electrodynamic driver that may be specifically designed for sound output at certain frequency bands, such as a woofer, tweeter, or midrange driver, for example. In one aspect, the speaker may be a "full-range" (or "full-band") electrodynamic driver that reproduces as much of an audible frequency range as possible. In another aspect, when the output device includes two or more speakers, each speaker may be a same type of speaker (e.g., all being full-range), or one or more speakers may be different than others, such as one being a woofer, while another is a tweeter. In some aspects, the speaker 26 may be an internal speaker, or may be an extra-aural speaker, as described herein.

In one aspect, any of the elements described herein may be a part of (or integrated into) the output device (e.g., integrated into a housing of the output device). In another aspect, at least some of the elements may be (e.g., a part of) one or more separate electronic devices that are communicatively coupled (e.g., via a BLUETOOTH connection) with the (e.g., controller via the network interface of the) output device. For instance, the speaker(s) may be integrated into the output device, while one or more of the sensors 31 may be integrated within another device, such as the playback device 2. In which case, the playback device may transmit sensor data to the output device, as described herein. In another aspect, the controller and one or more sensors may be integrated into another device. In which case, the other device may perform one or more audio signal processing operations (e.g., context-dependent AVC operations, as described herein), to produce one or more audio signals. Once produced, the signals may be transmitted to the output device for playback via the speaker 26.

As described herein, the controller 20 is configured to perform audio signal processing operations, such as context-dependent AVC. In one aspect, these operations may be performed while the controller is playing back sound. For instance, the controller 20 is configured to receive the audio signal 21 (which may include user-desired audio content, such as being a musical composition, a podcast, etc.), and may use the signal to drive the speaker 26. To perform the context-dependent AVC operations, the controller includes several operational blocks. As shown, the controller includes a device snapshot detector 28, a context engine and decision logic (or context engine) 29, a volume compensation model database 27, and a volume compensator 30.

The device snapshot detector 28 is configured to determine a device snapshot of the output device. Specifically, the snapshot may include a current state of one or more software applications that are being executed (and/or not currently being executed) by the electronic device. In one aspect, the current state may include an indication of whether (or which of) one or more software applications (e.g., having instructions that are stored in memory of the output device) are currently being executed by (e.g., one or more programmed processors of) the electronic device (e.g., where the software application performs one or more digital signal operations). For example, when the software application is a navigation application, the current state of the application may indicate that the application is active (e.g., running in the foreground), while the application retrieves routing instructions (e.g., from a remote server via the network 4), and is presenting the routing instructions to the user (e.g., audible instructions via the speaker 26). In one aspect, the current state may indicate whether an application is being executed in the background (e.g., unlike when an application is running in the foreground, none of the application's activities/operations are currently visible or noticeable to a user of the output device while the application is running in the background), or is running in the foreground, as described with respect to the navigation application.

In one aspect, the snapshot may include data relating to software applications that are stored and/or are being executed by the output device. In particular, the snapshot may indicate the type of software application that is being executed (e.g., whether the software application is the alarm application or the navigation application. The snapshot may also indicate whether any of the applications are playing back sounds. As described herein, the controller may perform context-dependent AVC while the controller drives the speaker 26 with the audio signal 21. In one aspect, the snapshot may indicate whether the audio signal is associated with one or more software applications. For example, the snapshot may indicate that the audio signal 21 is associated (or being played back by) an audio playback software application that is executing on the output device (e.g., where the user of the device opened the application and requested playback of audio content).

In another aspect, the snapshot may include data regarding an amount of resources (of the output device) that each application is using while executing. For example, the resources may indicate an amount of memory and processing resources (e.g., of one or more processors) of the output device. The data may indicate how long a software application has been executing since it was activated (e.g., opened by a user of the output device).

In some aspects, the snapshot may include historical data of one or more software applications of the output device. For instance, the historical data may indicate how often (e.g., within a period of time) the software application is opened and closed by the user of the device, may indicate how long (e.g., an average over a period of time) a software application executes, once opened (or activated) by the user. The historical data may indicate an average amount of resources a software application uses over the period of time. In another aspect, the snapshot may include historical data that is determined by the one or more software applications. For example, the snapshot may include health-care related data (e.g., a user's sleep schedule, times when the user eats, etc.). In some aspects, the historical data may include any information of one or more software applications of the output device. In some aspects, the device snapshot may include data such as which software applications are regularly executed by the output device (e.g., with respect to other software applications). In another aspect, the device snapshot may indicate which software applications require more (e.g., above a threshold) device resources than other applications. In another aspect, the device snapshot may include any type of historical data about one or more software applications.

In another aspect, the snapshot may indicate whether (and how) a user is interacting with a software application. For instance, the detector 28 may make this determination based on receiving user input 32 (e.g., while the software application is executing). In one aspect, the user input may be received at the output device. For example, the user input may be a voice command captured by microphone 22, which includes an instruction for a software application (e.g., a request for navigation instructions from the navigation application that is being executed by the output device). In another aspect, the user input may be received via one or more input devices that are communicatively coupled with (e.g., a part of) the output device, such as a physical control button or a touch-sensitive display screen (not shown) that is displaying a graphical user interface (GUI) of a software application. For instance, the user input may indicate a selection of one or more UI items (e.g., based on a tap on the screen) that are displayed on the screen. In another aspect, the detector may receive user input via other methods.

In another aspect, the snapshot may indicate whether a software application is (e.g., currently) presenting data to the user. As described herein, the snapshot may indicate whether a particular software application is running in the background or in the foreground. As a result, the snapshot may indicate what information (data) of the software application is being presented (or output) to the user while the application is in the foreground. For instance, when the output device is communicatively coupled with a display screen (not shown), the snapshot may indicate whether the display screen is displaying a GUI of the software application. In another aspect, the snapshot may indicate whether a software application is playing back one or more audio signals associated with the application via one or more speakers 26. Specifically, the snapshot may indicate whether audio content of the audio signal 21 that is being (or is to be) played back by the output device is associated with the software application. For instance, the snapshot may indicate that the audio signal includes audio content of the software application (e.g., when the software application is an alarm application, the snapshot may indicate that the audio content is a ringing tone to be played back).

In another aspect, the snapshot may include data (or information) relating to media content, such as audio content and/or video content, that is being played back by the output device. For example, when an audio playback software application that is being executed by the output device drives the speaker 26 with the audio signal 21, the snapshot may include metadata relating to audio content contained within the audio signal (e.g., when the audio content is a song, the metadata may include a title of the song, a performer of the song, a genre of the song, a duration of the song, etc.).

As described thus far, the snapshot may indicate whether user input 32 is received at the output device and/or whether the software application is presenting data to the user (e.g., through the output device). In another aspect, the snapshot may include information relating to one or more software applications from an electronic device (e.g., the playback device 2) that is communicatively coupled with the output device and is (at least partially) executing one or more software applications. For example, the playback device may include memory that is arranged to store one or more of the software applications (e.g., such as applications 37), and may include one or more processors that are arranged to execute the applications. In some aspects, applications being executed by both of the devices may be configured to interact (e.g., exchange data) with one another (e.g., via a wired and/or wireless network). For instance, the playback device may be executing a software application (which may be executable by the output device), such as the navigation application, and may receive user input (e.g., a user tap on a touch-sensitive display screen of the playback device that is displaying a graphical user interface (GUI) of the navigation application) to perform a navigation operation. In response, the playback device may transmit the user input (e.g., as one or more instructions) to the (e.g., device snapshot detector of the) output device, indicating the user interaction (e.g., a user request for directions). As another example, the snapshot detector may receive data from the playback device indicating whether the device is presenting data of a software application, such as whether the navigation application that is executing on the playback device is displaying navigation instructions via the display screen of the playback device.

The volume compensation model database 27 includes one or more volume compensation models that each have one or more audio tuning parameters with which the volume compensator 30 may use to process one or more audio signals (e.g., audio signal 21) for playback by the speaker 26. In some aspects, the database 37 may be (e.g., at least partially) stored within the memory 36 and/or within the controller 20, as shown. In one aspect, the database may store a table (e.g., as a data structure) that includes one or more volume compensation models, each associated with (or having) one or more audio tuning parameters. FIG. 3 shows an example of such a data structure 35 that is stored within the database 27. Specifically, the data structure is a table of one or more volume compensation models and their associated one or more audio tuning parameters. As shown, the data structure includes two models (a first and second model), but as described herein may include more (or less) models. Each model within the data structure includes one or more audio tuning parameters. For example, both the first and second models include scalar gain values (V1, V2), which may be applied to one or more audio signals by the volume compensator 30 in order to attenuate (or increase) a signal level of the applied signals. Each model is also associated with a compressor type for the volume compensator to reduce dynamic range of an applied audio signal. In one aspect, the database may have one or more different compressor types. For example, the first model includes a broadband compressor, which when applied by the volume compressor compresses an entire (e.g., audible) frequency range of an audio signal (e.g., which may have a frequency range between 20 Hz to 20 kHz). The second model includes a multi-band compressor, which when applied compresses a subset of one or more frequency bands of the entire frequency range of the audio signal. For example, the multi-band compressor may only compress low-frequency content. In another aspect, the multi-band compressor may compress different frequency bands differently. For instance, the multi-band compressor may compress low-frequency content (e.g., frequency content below a first threshold), mid-range frequency content (e.g., frequency content between the first threshold and a second threshold that is greater than the first threshold), and high-frequency content (e.g., frequency content above the second threshold), differently between each other.

The models also include compression ratios ($R_1$, $R_2$), each of which specifies an amount of attenuation that the compressor is to apply to one or more signals. In addition, the models include attack times ($T_{A1}$, $T_{A2}$), which indicates an amount of time it takes for one or more audio signals to become fully compressed, and includes release times ($T_{R1}$, $T_{R2}$), which indicates an amount of time to release (or remove) the compression upon the signal. Thus, upon the volume compensator 30 applying the first model to the audio signal 21, the compensator would apply a broadband compressor, with a compression ratio of $R_1$, having an attack time $T_{A1}$ for applying the compressor 9 e.g., once a threshold level is exceeded, for example), and release time $T_{R1}$ for removing the broadband compressor.

In one aspect, the models may include one or more additional audio tuning parameters. For instance, the parameters may include one or more thresholds (e.g., in dB), with which the volume compensator uses to determine whether or not to engage a particular compressor. In another aspect, the models may include one or more audio filters, such as a low-pass filter, a band-bass filter, and a high-pass filter. In another aspect, one or more models may include a limiter that is configured to limit the level below a threshold (e.g., maximum) level. In some aspects, the models may include spatial filters that allow the volume compensator to spatially render the audio signals. For instance, the spatial filters may include one or more head-related transfer functions (HRTFs), or equivalently, one or more head-related impulse responses (HRIRs), which when applied to one or more audio signals may produce spatial audio (e.g., binaurally rendered audio signals).

In another aspect, one or more models may include multiple audio tuning parameters. For instance, the second model may include one or more compression ratios, each compression ratio to be applied to a different set of one or more frequency bands, when the multi-band compressor compresses the audio signal. In another aspect, one or more models may include less audio tuning parameters (e.g., than other models). For example, one model may not include the scalar gain values, but instead only include compressor parameters (e.g., compressor type, ratio, and attack/release times).

In one aspect, the volume compensation models may be predefined models, which may have been defined in a controlled environment (e.g., within a laboratory). In another aspect, at least some of the models may be user-defined (e.g., based on user input received by the output device). In some aspects, the volume compensation models may be derived (e.g., over time) based on user preferences and/or based on model selections by the context engine 29. More about deriving models based on selections of the context engine is described herein.

In one aspect, the volume compensation models (e.g., stored within the database 27) may be associated with one or more contexts of the output device. Specifically, each model may be configured to compensate (or adapt) the sound output of the output device according to a particular context (or scenario). In one aspect, the models may be configured to optimize audio content of an audio signal that is to be compensated by the volume compensator 30. For example, multi-band compressors may be a preferred type of compressor when audio content of an audio signal that is to be compressed has speech in order to improve intelligibility. Thus, the second model may be configured to optimally adapt sound output of an audio signal that includes speech (e.g., a podcast). Broadband compensators may be optimal for audio content that does not include speech (or does not only speech, such as a musical composition). As a result, the first model may be configured to optimally adapt sound output of an audio signal that includes a musical composition. In another aspect, the models may be associated with particular environmental conditions. For example, the first model may be associated with the output device being in a noisy environment (e.g., in an environment where the noise ambient level is above a threshold), and as a result the scalar gain value may be high (e.g., above a gain threshold). Conversely, the second model may be associated with the output device being in a quiet environment (e.g., the noise ambient level being below the threshold), and as a result the scalar gain value may be low (e.g., below the gain threshold).

In another aspect, the models may be configured to compensate sound output based on a determined context of the output device, such as an activity that is being performed by a user of the output device, for example. For instance, the data structure 35 may include a model that is configured to optimize sound output while a user of the output device is riding a bike and listening to music (e.g., where the model includes a gain value to increase the sound level of the sound output in order to compensate for wind noise). More about the models being configured to compensate sound output based on a determined context of the output device is described herein.

The context engine 29 is configured to determine a context of the output device, with which the engine determines (or selects) one or more volume compensation models for adapting the sound output (e.g., volume) of the output device. More about adapting the sound output using volume compensation models is described herein. In one aspect, the "context" of the output device may be a state (e.g., an operational state, a physical state, etc.) of the device and/or an activity or disposition of the user of the device. For instance, the context engine may perform an introspective analysis of the output device and/or an outward analysis of the environment and/or the state (or activity) of the user of the device (e.g., based on sensor data, a device snapshot of the output device, etc.), and use (at least some of) this information to determine an overall context of the device.

In one aspect, the context engine may analyze the environment in which the output device is located to determine details (or information) about the environment (which may indicate whether the volume level of sound output should be adjusted). In one aspect, the context engine 29 may use sensor data obtained from one or more sensors 31 to analyze the environment in which the output device is located. For example, the context engine may determine a location of the output device (e.g., within the environment). To do this, the context engine may receive GPS sensor data that indicates a (e.g., precise) location of the output device. In another aspect, the context engine may determine the location of the output device based on one or more sensors. For instance, the context engine may use image data captured by the camera 23 to perform an object recognition algorithm to identify the location in which the output device is located (e.g., identifying cross-walks and moving cars that indicate that the user and the output device are at a busy (and noisy) intersection). As another example, upon identifying trees and a bench, the context engine may determine that the output device is in a park, which may be generally quiet. In another aspect, the context engine may determine the location based on the device snapshot determined by (and received from) the detector 28. For instance, the snapshot may indicate that a navigation application is being executed and a location of the output device along a navigational route that is currently being presented to the user. In another aspect, the context engine may determine the location based on historical data (e.g., of the sensors 31). For instance, the context engine may determine that the output device is at a particular location at a particular time, based on historical data that indicates (e.g., a trend or pattern) in which the output device has been at this particular location at (approximately) this particular time in the past (e.g., for a threshold number of days, etc.). For instance, historical location data may indicate that the user and the output device are in a restaurant eating at (or around) 6 PM. In another aspect, along with (or in lieu of) identifying the location, the context engine may identify objects within the location. As described herein, using image data captured by the camera, the context engine may determine what objects are within the environment.

As described herein, details about the environment may indicate whether the volume level of the sound output should be adjusted. Specifically, may determine whether the environment has ambient noise based on at least some sensor data. For instance, the context engine may determine an ambient noise level within the environment based on activity and/or objects that are detected within the environment. Returning to the previous example regarding being at a busy intersection, the context engine may determine that the output device is in a noisy environment based on an estimation of noise created by identified objects within the environment. As a result, the context engine may determine (or estimate) the ambient noise level based on an estimation of noise caused by identified moving cars, an identified firetruck with its lights on, etc.

In some aspects, the context engine 29 may determine whether the environment in which the output device is located includes ambient noise, and may determine a noise level of the noise. For instance, the context engine may obtain one or more microphone signals from the microphone 22, and may process the microphone signals to determine a noise level of ambient noise contained therein. In one aspect, the noise level may indicate how much spectral content the ambient noise has across one or more frequency bands. For instance, the level may indicate that the ambient noise includes more low-frequency spectral content (e.g., above a threshold) than high-frequency spectral content. In another aspect, the context engine may determine the type of ambient noise contained within the environment. For instance, the context engine may analysis the ambient noise to identify the type of noise, such as whether the noise includes a musical composition, and/or whether the noise includes speech (e.g., by performing a voice activity detection (VAD) algorithm upon the microphone signal).

In another aspect, the context engine 29 may determine whether the output device is stationary or moving within an environment using sensor data. For example, the context engine may determine movement based on motion data received from the IMU 25. In another aspect, the context engine may determine that the output device is moving based on GPS sensor data and/or based on changes within the environment (e.g., as determined based on changes to objects within image data captured by the camera 23).

In some aspects, the context engine may analyze the audio signal 21 to determine the audio content contained therein. For instance, the context engine 29 may receive the audio signal 21, of which the controller 20 may be using to drive the speaker 26, determine a type of audio content that is (e.g., currently or is going to be) played back by the output device based on an analysis of the audio content. Specifically, the engine may perform VAD operations to determine whether the audio content contains speech. In another aspect, the engine may perform a spectral analysis upon the audio signal to determine the audio content contained therein, such as whether the audio content is a musical composition, and the spectral content of that composition (e.g., having more low spectral content than high spectral content, etc.). In yet another aspect, the context engine may determine information related to the audio signal using the device snapshot, as described herein.

In one aspect, the context engine may be configured to determine whether the user of the output device is performing a physical activity (e.g., while the output device is a part of or coupled to the user). Specifically, the context engine may determine that the user is performing an activity based on user input. For instance, using the device snapshot received from the device snapshot detector 28, the context engine may determine whether one or more software applications are being executed that are associated with a physical activity. For example, upon determining that an exercise software application has been activated (or opened) by the user and the user has requested (e.g., via user input 32) that the application keep track of an exercise (e.g., a run), the context engine may determine that the user is jogging outside. In another aspect, the context engine may determine that the user is at a particular place performing a particular activity (e.g., working out at a noisy gym), using entries within a calendar software application (which indicates that the user works out at particular times during particular days of the week).

As described herein, the context engine may determine whether the user is performing a physical activity based on user input. In another aspect, the context engine may determine whether the user is active based on an analysis of sensor data and/or the device snapshot. For example, the context engine may determine that the user is driving a car based on navigation information within the device snapshot and/or based on location/motion data. As another example, the context engine may determine that the user is eating based on location data (e.g., obtained from the GPS sensor, the map/navigation software application, etc.) that indicates that the user is at a particular restaurant. Along with location data, the context engine may determine the user is eating based on image data captured by the camera (e.g., which may include objects, such as a plate, fork, water glass, etc.).

In another aspect, the context engine may determine whether the user is performing other activities, such as talking to another person. For instance, the context engine may determine whether the user is conducting a telephone call, based on data obtained from the telephony application. In another aspect, the context engine may determine whether the user is conducting a conversation based on sensor data. For instance, the context engine may determine whether the user is talking based on whether an accelerometer signal produced by the accelerometer 24 is above a threshold. As another example, the context engine may determine whether another person is within a field of view of the camera 23, and whether that person has facial features that indicate that the person is talking (e.g., whether lips of the person are moving).

In another aspect, the context engine may determine whether the user is performing an activity based on historical data (e.g., obtained from the device snapshot). Specifically, the context engine may determine that the user is performing a particular activity based on one or more patterns within (e.g., reoccurring) historical data. For instance, the context engine may determine that the user is home between 6 PM to 9 PM, based on the output device receiving location data in the past that indicates that the user is normally home during those times.

In one aspect, the context engine 29 may determine the (e.g., overall) context of the output device based on one or more determinations described herein. For instance, the context engine may determine the context as the user (and the output device) are walking on a sidewalk towards a busy intersection, based on location data, user activity (e.g., based on receiving walking directions through the navigation application), and based on a noise level. Thus, one or more of the determinations by the context engine may indicate a context of the user and/or output device. In one aspect, upon determining the context, the context engine may be configured to select one or more volume compensation models from the database 27 that are associated with the context. More about selecting one or more models is described herein.

In one aspect, the determined context of the output device may indicate how sound output should be adjusted based on estimated (determined or assumed) ambient noise within the environment. Returning to previous examples, upon determining that the user is working out in a noisy gym or at a busy intersection, the context may indicate that there is a significant amount of ambient noise (e.g., above a threshold). In contrast, upon determining that the user is sitting in a park or at home eating dinner, the context may indicate that there is very little (below a threshold) ambient noise. In another aspect, the context may indicate what spectral content is also within the environment in which the device is located. For instance, upon determining that the user is next to a fire truck with its lights and sirens on, the context may indicate that the environment has an increased amount (e.g., above a magnitude threshold) of mid-range frequency content (e.g., between 500 Hz to 1,500 Hz).

The context engine 29 is configured to determine (or select) one or more volume compensation models from the volume compensation models database 27 based on the determined context of the output device. As described herein, the volume compensation models may be associated with one or more contexts of the output device. In which case, the context engine may perform a table lookup into the data structure 35 using the determined context to select one or more volume compensation models that are associated with the determined context. Upon finding a model that has a matching context, the context engine may select the model. In one aspect, one or more of the models may be specialized for a particular environment in which the output device is in. For example, when the context indicates that there is a firetruck next to the user, the model may minimize the spectral impact of the sound of the siren. As another example, a model may be optimized for user activity, such as having audio tuning parameters that minimize the user's perception of wind noise when the user is riding a bicycle.

In another aspect, the context engine may select one or more audio tuning parameters from one or more volume compensation models based on the determined context. As a result, the context engine may mix and match audio tuning parameters from various compensation models in order to create (or build) an optimized volume compensation model for the determined context.

The volume compensator 30 is configured to receive the audio signal 21 and the one or more selected volume compensation models from the context engine 29, and is configured to process the audio signal (e.g., adapting sound output of the audio signal) according to the selected volume compensation model. For example, the model may indicate that a particular gain value is to be applied to the audio signal (e.g., in order to increase the signal level of the audio signal, due to the context of the output device being within a noisy environment). As a result, the compensator may apply the scalar gain in order to increase the audio signal's level, and may use the processed audio signal to drive the speaker 26.

In one aspect, the volume compensator may process the audio signal according to the selected volume compensation model and the microphone signal. Specifically, the volume compensator may (optionally) obtain the microphone signal, and may use the microphone signal to apply the volume compensation model to the audio signal. For instance, upon the ambient noise level exceeding a threshold, the volume compensator may process the audio signal according to the model. Conversely, upon the ambient noise level dropping below the threshold, the compensator may not process (or may partially process) the audio signal. For instance, upon the ambient noise level dropping below the threshold, the volume compensator may adjust the compression ratio and/or scalar gain value (e.g., due to the environment being quiet), but may maintain the attack/release times. As another example, the volume compensator may measure background noise levels, and then dynamically adjust the input gain on a limiter (or compressor) of the volume compensation model. Alternatively, the volume compensator may adjust thresholds and gains on a multi-band compressor (e.g., based on the measured background noise levels.

As described herein, the volume compensation models may be predefined (or created) in a controlled environment. In some aspects, the volume compensation models may be determined (or defined) over a period of time based on listening patterns of the user of the output device. Specifically, the controller 20 may create volume compensation models based on user adjustments to the volume level of sound output based on a determined context of the output device. For instance, the context engine may determine (e.g., based on sensor data) that the user is performing a physical activity, such as running outside. The context engine may also determine that the output device has received user input to increase the volume level (e.g., via a voice command captured by the microphone 22). As a result, the context engine may create a volume compensation model with a scalar gain value to increase sound output. In addition, the context engine may derive audio tuning parameters based on sensor data. For instance, while the user is running, the microphone may capture a lot of (e.g., above a threshold) wind noise. As a result, the context engine may select one or more audio tuning parameters that optimize the compressor of the model to reduce the effect of the wind noise on the sound output.

In one aspect, the controller 20 may be configured to perform (additional) audio signal processing operations based on elements that are coupled to the controller. For instance, when the output device includes two or more "extra-aurar" speakers, which are arranged to output sound into the acoustic environment rather than speakers that are arranged to output sound into a user's ear (e.g., as speakers of an in-ear headphone), the controller may include a sound-output beamformer that is configured to produce speaker driver signals which when driving the two or more speakers produce spatially selective sound output. Thus, when used to drive the speakers, the output device may produce directional beam patterns that may be directed to locations within the environment.

In some aspects, the controller 20 may include a sound-pickup beamformer that can be configured to process the audio (or microphone) signals produced two or more external microphones of the output device to form directional beam patterns (as one or more audio signals) for spatially selective sound pickup in certain directions, so as to be more sensitive to one or more sound source locations. In some aspects, the controller may perform audio processing operations upon the audio signals that contain the directional beam patterns (e.g., perform spectrally shaping).

In one aspect, the context-dependent AVC operations may be performed by (or in conjunction with operations of) an audio playback software application that is executed by the output device. For instance, the playback application may be configured to drive the speaker 26 with the audio signal 21. In one aspect, the playback application may playback the audio signal in response to user input (e.g., the application detecting a voice command to playback a musical composition, using the microphone signal). As a result, while playing back the audio signal, the playback application may perform the AVC operations of the operational blocks of the controller 20, as described herein in order to adapt sound output according to the context (e.g., the environment, user activity, audio content, etc.) of the output device.

Figure 4:
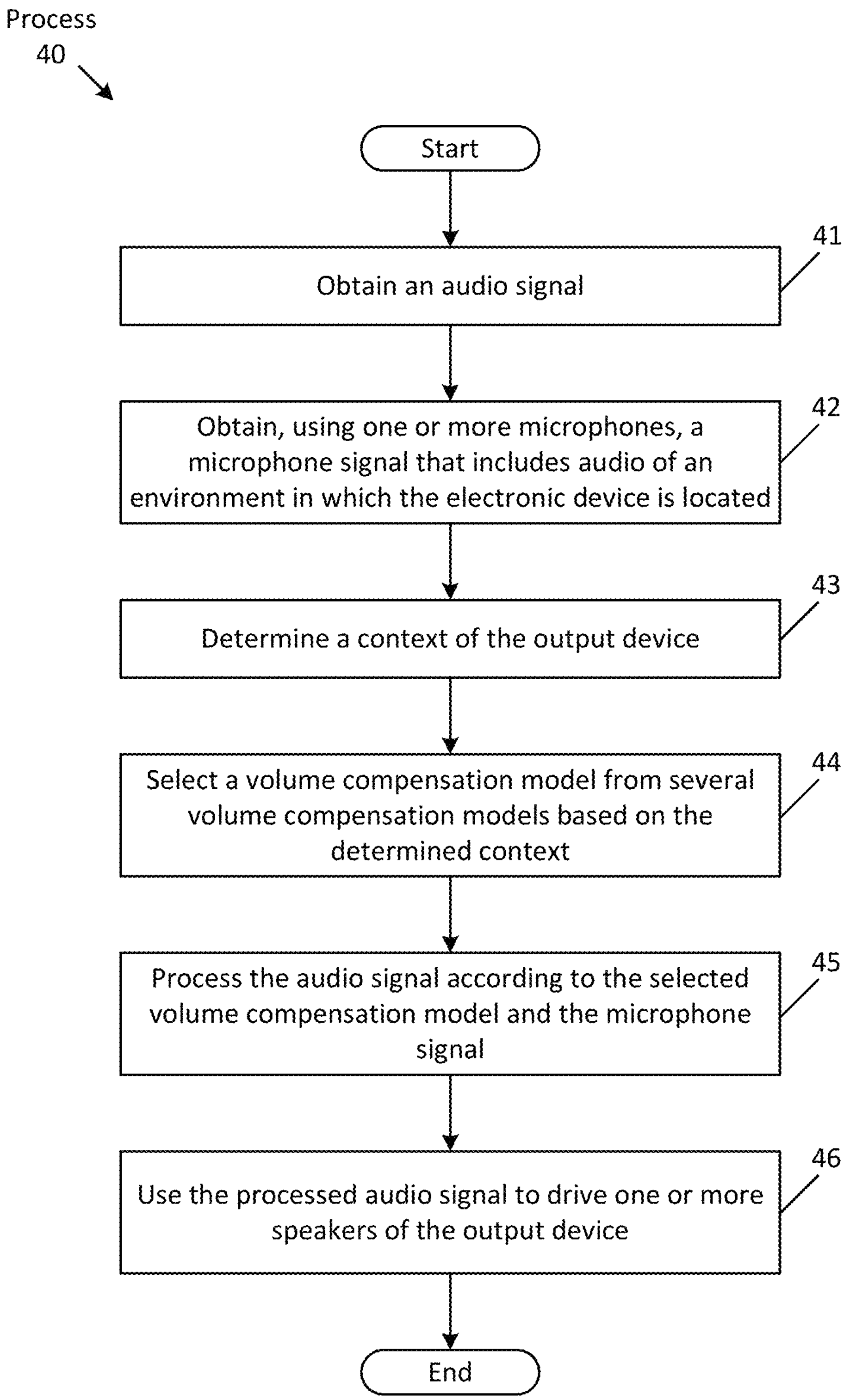
FIG. 4 is a flowchart of a process for performing context-dependent automatic volume compensation according to one aspect.
Figure 5:
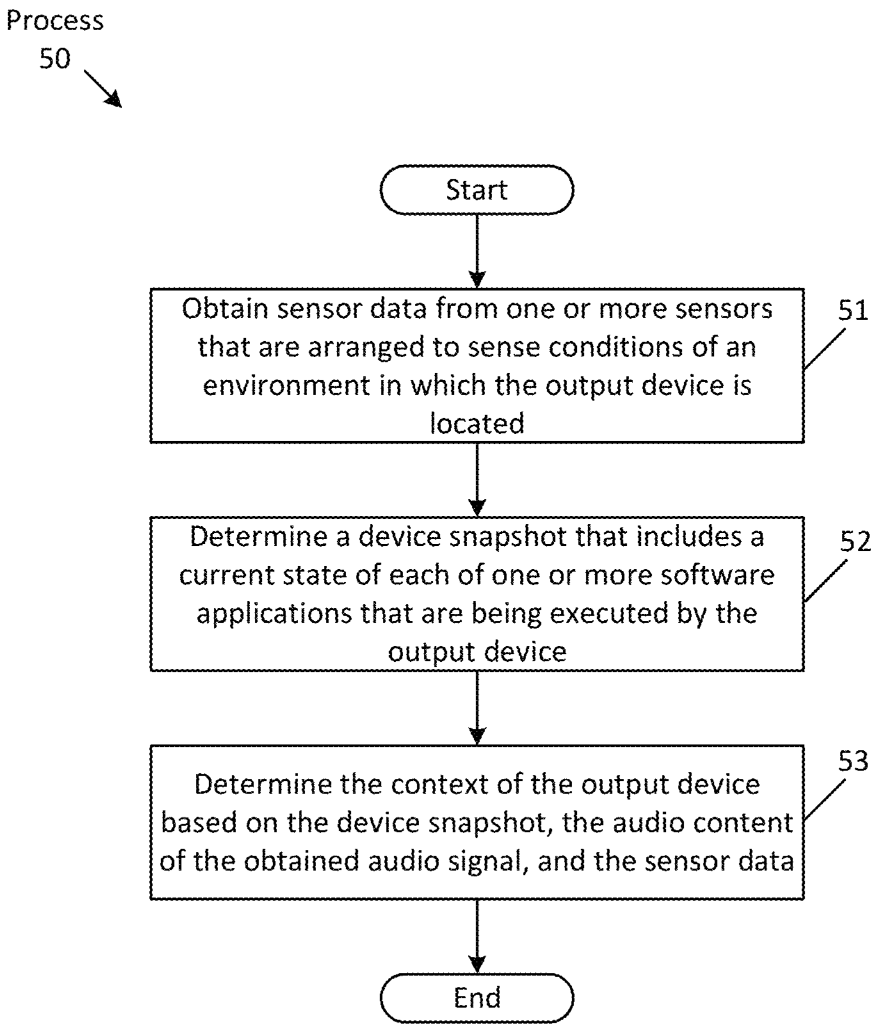
FIG. 5 is a flowchart of a process for determining a context of the output device according to one aspect.

FIGS. 4 and 5 are flowcharts that include processes 40 and 50, respectively, that may be performed by the (e.g., controller 20 of the) output device 3. In another aspect, at least some of the operations may be performed by one or more software applications (e.g., audio playback software application) that is being executed by (e.g., the controller of the) device.

FIG. 4 is a flowchart of a process 40 for performing context-dependent AVC according to one aspect. The process begins by the controller obtaining (or receiving) an audio signal (e.g., signal 21, as shown in FIG. 2) that includes audio content, such as a musical composition, a podcast, etc. (at block 41). The controller obtains, using one or more microphones, a microphone signal that includes audio (e.g., ambient noise) of an environment in which the electronic device is located (at block 42). The controller determines a context of the output device (at block 43). For instance, the context engine 29 may determine the context as the output device being at a noisy intersection, while the user of the device is running. As another example, the context engine may determine that the output device is in a quiet room, while the user of the device is reading a book. Such determinations may be based on sensor data from one or more sensors 31 and/or based on a determined device snapshot. More about determining the context is described in FIG. 5.

The controller 20 selects a volume compensation model from several volume compensation models (e.g., stored in data structure 35 within database 27) based on the determined context (at block 44). Specifically, the controller determines one or more audio tuning parameters for the volume compensator based on the sensor data of one or more sensors 31, the device snapshot, and/or audio content of the audio signal, as described herein. As described herein, each (or at least some) of the models may be associated with one or more contexts. Thus, the context engine 29 may perform a table looking into data structure 35 to select the model that is associated with the determined context. The controller processes the audio signal according to the selected volume compensation model and the microphone signal (at block 45). Specifically, the controller processes, using the volume compensator 30, the audio signal according to one or more audio tuning parameters of the volume compensation model. In one aspect, the volume compensator may use the microphone signal to determine how to apply the volume compensation model to the audio signal. For example, the volume compensator may adjust (or apply) one or more audio tuning parameters based on the audio noise level of noise contained within the microphone signal. In particular, as the noise level changes (e.g., along with the spectral content contained therein), the compensator may adjust the compression ratio of the associated compressor of the model. As a result, the compensator may adjust the dynamic range of the audio signal, according to the noise level of the environment. The controller uses the processed audio signal to drive one or more speakers of the output device (at block 46).

Some aspects may perform variations to the process 40. For example, the specific operations may not be performed in the exact order shown and described. The specific operations may not be performed in one continuous series of operations and different specific operations may be performed in different aspects. For example, the output device may use the obtained audio signal to drive the one or more speakers, while at least some of the operations are being performed by the controller. Specifically, once the audio signal is obtained, the controller may perform the operations in (at least some of) blocks 42-46, while the output device uses the audio signal to drive the signal. Once the signal is processed, at block 45, the controller may use the processed signal to drive the speaker, as described herein.

As described herein, the controller received the audio signal 21, and processes the audio signal according to the selected model. In another aspect, the controller may receive multiple (one or more) audio signals. For instance, the controller may receive one audio signal associated with an audio playback application (e.g., containing a musical composition) and another audio signal associated with a navigation application (e.g., containing verbal navigation instructions). In which case, the controller may process the audio signals differently based on the determined context. For example, the controller may determine that the user of the output device is interacting with the audio playback application (e.g., looking for a new musical composition for playback). As a result, the controller may determine that the user is more interested in the audio content of the audio playback application as opposed to that of the navigation application. In response, the controller may select different volume compensation models for each audio signal, where the volume compensator processes each audio signal according to its associated model. Once processed, the volume compensator may mix (e.g., by performing matrix mixing operations) the audio signal for playback. Thus, in this example, the audio content of the audio playback application may have a higher volume level than audio content of the navigation application. In another aspect, rather than selecting different models for each signal, the volume compensator may process the signals differently according to one model (e.g., by performing some audio signal processing operations upon one signal, but not the other).

In another aspect, the controller may be performing at least some of these operations (e.g., continuously), while using the audio signal to drive the speaker. As a result, the controller may continuously determine whether the context of the output device has changed. For example, the controller may perform the process 40 to determine the context of the output device as the user running outside. In response, the controller may select a volume compensation model (or one or more tuning parameters), and process the audio signal according to the model. The controller may continuously monitor data (e.g., sensor data, device snapshot data, etc.) to determine whether the context has changed. Continuing with the previous example, the controller may determine that the user is no longer running outside based on sensor data (e.g., a reduction in IMU data), and based on a device snapshot (e.g., an exercise software application indicating that the user has completed an outdoor running workout, etc.). Moreover, the controller may determine that the user is sitting down inside a quiet room (e.g., based on the data described herein). As a result of determining a change to the context (or determining a new context), the controller may perform at least some of the operations of process 40, according to the changed context. For instance, the controller may select a different volume compensation model (e.g., a different audio tuning parameter) based on the changed context. For example, since the user is sitting in a quiet room, the applied scalar gain value may be reduced. The controller may then process the audio signal according to the different model (and the microphone signal).

FIG. 5 is a flowchart of a process 50 for determining a context of the output device according to one aspect. Specifically, the operations described in this process may be performed by the controller 20 of the output device. The process begins by the controller 20 receiving sensor data from one or more sensor (e.g., sensors 31 of FIG. 2) that are arranged to sense conditions of an environment in which the output device is located (at block 51). The controller determines a device snapshot that includes a current state of each of one or more software applications that are being executed by the output device (at block 52). For example, the device snapshot may include the current state (e.g., one or more operations being performed) by the one or more software applications, which may include a snapshot of a playback software application (which may be executing one or more of the context-dependent AVC operations, as described herein). The controller determines the context of the output device based on the device snapshot, the audio content of the obtained audio signal, and/or the sensor data (at block 53). For example, the context of the device may be that a user of the device is on an outdoor jog, based on an exercise application that is executing on the device and based on location (e.g., GPS) data.

Some aspects may perform variations to the process 50. For example, the specific operations may not be performed in the exact order shown and described. The specific operations may not be performed in one continuous series of operations and different specific operations may be performed in different aspects. In one aspect, the context may be determined based on less data, such as being based on only the device snapshot. As an example, the context engine may determine (e.g., within a certainty) that the user is eating dinner, based on previously determined eating patterns of the user.

As described thus far, the output device may be configured to perform context-dependent AVC operations in order to adjust the volume level of sound output. In one aspect, the output device may perform such operations when a user of the device is unable to manually adjust the volume level. Specifically, the output device may not include a (e.g., hardware) volume control that is arranged to adjust a sound output level of one or more speakers of the output device. As a result, the output device may dynamically and automatically compensate volume levels based on the context of the output device so that the listener maintains an optimal user experience, regardless of what context the user and device are in.

According to one aspect of the disclosure, an electronic device that includes a processor and memory having instructions which when executed by the processor causes the electronic device to obtain an audio signal that includes audio content; obtain sensor data from one or more sensors that are arranged to sense conditions of an environment in which the electronic device is located; determine a device snapshot that includes a current state of each of one or more software applications are being executed by the electronic device, wherein the one or more software applications that are being executed includes the audio playback software application; determine at least one audio tuning parameter for a volume compensator based on the sensor data, the snapshot of the one or more software applications, and the audio content of the audio signal; process, using the volume compensator, the audio signal according to the determined audio tuning parameter; and use the processed audio signal to drive one or more speakers.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the network operations, context-dependent AVC operations, and (other) audio signal processing operations, as described herein. In other aspects, some of these operations might be performed by specific hardware components that contain hardwired logic. Those operations might alternatively be performed by any combination of programmed data processing components and fixed hardwired circuit components.

In one aspect, the context of the electronic device is based on sensor data from one or more sensors of the electronic device that include a global positioning system (GPS) sensor, a camera, a microphone, a thermistor, an inertial measurement unit (IMU), and an accelerometer. In some aspects, the context of the electronic device is a location of the electronic device. In another aspect, the device determines a change to the context of the electronic device; selects a different volume compensation model from the plurality of volume compensations models based on the change to the context; and processes the audio signal according to the selected different volume compensation model and the microphone signal. In some aspects, each volume compensation model comprises at least one of 1) one or more scalar gain values to apply to the audio signal, 2) a broadband compressor or a multi-band compressor, 3) a compression ratio, 4) an attack time of the broadband compressor or the multi-band compressor for applying the compression ratio, and 5) a release time of the broadband compressor or the multi-band compressor for removing the compression ratio. In another aspect, processing the audio signal according to the selected volume compensation model and the microphone signal comprises using the selected volume compensation model to compensate the audio signal for the audio of the environment. In one aspect, the electronic device is a portable device. In another aspect, the electronic device is a wearable device. In some aspects, the wearable device is either a pair of smart glasses or a smart watch.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B." or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B. and/or C" may refer to "A," "B," "C," "A and B," "A and C," "B and C," or "A, B, and C."

What is claimed is:

1. A method performed by one or more programmed processors of an electronic device, the method comprising:

obtaining an audio signal;

obtaining, using one or more microphones, a microphone signal that includes audio of an environment in which the electronic device is located;

determining a context of the electronic device based at least partially on audio content of the audio signal;

selecting a volume compensation model from a plurality of volume compensation models based on the determined context, wherein, when the audio content does not include speech, the selected volume compensation model comprises a broadband compressor, and when the audio content includes speech, the selected volume compensation model comprises a multi-band compressor;

processing the audio signal according to the selected volume compensation model and the microphone signal; and using the processed audio signal to drive one or more speakers of the electronic device.

2. The method of claim 1, wherein, the broadband compressor is configured to compress an entire frequency range of the audio signal, and the multi-band compressor is configured to compress a subset of one or more frequency bands of the entire frequency range of the audio signal.

3. The method of claim 1, wherein the context of the electronic device includes an indication that one or more software applications are being executed by at least one programmed processor of the electronic device.

4. The method of claim 3, wherein the audio signal is associated with a software application of the one or more software applications with which a user of the electronic device is interacting.

5. The method of claim 1, wherein the context of the electronic device includes activity of a user of the electronic device.

6. The method of claim 5, wherein the activity of the user comprises at least one of an interaction between the user and the electronic device and a physical activity performed by the user while the electronic device is a part of or coupled to the user.

7. The method of claim 1, wherein the one or more speakers are integrated within the electronic device, wherein the electronic device does not include a hardware volume control that is arranged to adjust a sound output level of the one or more speakers of the electronic device.

8. An electronic device comprising:

one or more microphones;

one or more speakers;

one or more processors; and memory having instructions stored therein which when executed by the one or more processors causes the electronic device to:

obtain an audio signal, obtain, using the one or more microphones, a microphone signal that includes audio of an environment in which the electronic device is located, determine a context of the electronic device based at least partially on audio content of the audio signal, select a volume compensation model from a plurality of volume compensation models based on the determined context, wherein, when the audio content does not include speech, the selected volume compensation model comprises a broadband compressor, and when the audio content includes speech, the selected volume compensation model comprises a multi-band compressor, process the audio signal according to the selected volume compensation model and the microphone signal, and use the processed audio signal to drive the one or more speakers.

9. The electronic device of claim 8, wherein, the broadband compressor is configured to compress an entire frequency range of the audio signal, and the multi-band compressor is configured to compress a subset of one or more frequency bands of the entire frequency range of the audio signal.

10. The electronic device of claim 8, wherein the context of the electronic device includes an indication that one or more software applications are being executed by at least one processor of the electronic device.

11. The electronic device of claim 10, wherein the audio signal is associated with a software application of the one or more software applications with which a user of the electronic device is interacting.

12. The electronic device of claim 8, wherein the context of the electronic device includes activity of a user of the electronic device.

13. The electronic device of claim 12, wherein the activity of the user comprises at least one of an interaction between the user and the electronic device and a physical activity performed by the user while the electronic device is a part of or coupled to the user.

14. The electronic device of claim 8, wherein the one or more speakers are integrated within the electronic device, wherein the electronic device does not include a hardware volume control that is arranged to adjust a sound output level of the one or more speakers of the electronic device.

15. A method performed by an audio playback software application that is being executed by one or more programmed processors of an electronic device, the method comprising:

obtaining an audio signal that includes audio content;

obtaining sensor data from one or more sensors that are arranged to sense conditions of an environment in which the electronic device is located;

determining a device snapshot that includes a current state of each of one or more software applications are being executed by the electronic device, wherein the one or more software applications that are being executed includes the audio playback software application;

determining at least one audio tuning parameter for a volume compensator based on the sensor data, the snapshot of the one or more software applications, and the audio content of the audio signal;

processing, using the volume compensator, the audio signal according to the determined audio tuning parameter; and using the processed audio signal to drive one or more speakers.

16. The method of claim 15, wherein the current state of each of the one or more software applications indicates at least one of the software application that is currently being executed by the electronic device, whether a user of the electronic device is interacting with a software application, and whether the audio content of the audio signal is associated with the software application.

17. The method of claim 15, wherein the device snapshot is a first device snapshot that includes a first state of a software application that is being executed by the electronic device, and wherein the method further comprises:

determining a second device snapshot that includes a second state of the software application that different than the first state;

determining a different audio tuning parameter based on at least the second state of the software application; and processing the audio signal according to the determined different audio tuning parameter.

18. The method of claim 15, wherein determining the at least one audio tuning parameter comprises determining:

a scalar gain value for the volume compensator to apply to the audio signal, and a compression ratio, an attack time, and a release time for which the volume compensator is to compress the audio signal.

19. The method of claim 15, wherein the one or more sensors comprises at least one of a global positioning system (GPS) sensor, a camera, an accelerometer, a thermistor, an inertial measurement unit (IMU), and a microphone.

20. The method of claim 15, wherein the electronic device is a wearable device.

* * * * *